United States Patent
Wanakule et al.

(10) Patent No.: US 11,420,902 B2
(45) Date of Patent: Aug. 23, 2022

(54) MATERIAL COMPRISING A STACK WITH THERMAL PROPERTIES

(71) Applicant: SAINT-GOBAIN GLASS FRANCE, Courbevoie (FR)

(72) Inventors: Nisita Wanakule, Paris (FR); Julien Beutier, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 226 days.

(21) Appl. No.: 16/632,680

(22) PCT Filed: Jun. 25, 2018

(86) PCT No.: PCT/EP2018/066941
§ 371 (c)(1),
(2) Date: Jan. 21, 2020

(87) PCT Pub. No.: WO2019/015917
PCT Pub. Date: Jan. 24, 2019

(65) Prior Publication Data
US 2020/0207657 A1    Jul. 2, 2020

(30) Foreign Application Priority Data
Jul. 21, 2017 (FR) ...................... 1756949

(51) Int. Cl.
*B32B 15/04* (2006.01)
*B32B 17/06* (2006.01)
*C03C 17/36* (2006.01)

(52) U.S. Cl.
CPC ........ *C03C 17/3639* (2013.01); *C03C 17/366* (2013.01); *C03C 17/3644* (2013.01); *C03C 2204/00* (2013.01); *C03C 2217/212* (2013.01); *C03C 2217/216* (2013.01); *C03C 2217/256* (2013.01); *C03C 2217/258* (2013.01); *C03C 2217/281* (2013.01); *C03C 2217/734* (2013.01); *C03C 2217/91* (2013.01)

(58) Field of Classification Search
CPC .................. C03C 17/366; C03C 2217/734
USPC ................................... 428/432, 434
See application file for complete search history.

(56) References Cited

U.S. PATENT DOCUMENTS

| | | | |
|---|---|---|---|
| 10,138,159 B2 * | 11/2018 | Ding | C03C 17/3615 |
| 10,916,354 B2 * | 2/2021 | Kato | G02B 5/26 |
| 2006/0280951 A1 | 12/2006 | Fleury et al. | |
| 2010/0046191 A1 | 2/2010 | Den Boer et al. | |
| 2012/0225224 A1 | 9/2012 | Blacker et al. | |
| 2014/0022630 A1 | 1/2014 | Reymond et al. | |
| 2014/0198389 A1 * | 7/2014 | Laurent | G02B 1/11 |
| | | | 359/585 |
| 2014/0237917 A1 | 8/2014 | Theios et al. | |

FOREIGN PATENT DOCUMENTS

WO   WO 2012/093238 A1   7/2012
WO   WO 2017/006029 A1   1/2017

OTHER PUBLICATIONS

International Search Report as issued in International Patent Application No. PCT/EP2018/066941, dated Aug. 30, 2018.
Bratvold, J.E., et al., "Atomic Layer Deposition of oriented nickel titanate ($NiTiO_3$)," Applied Surface Science, vol. 311, Aug. 2014, XP028875811, pp. 478-483.
Dahmouchène, N., et al., "Optical properties of $NiCrO_x$ thin files," Physica Status Solidi (C), vol. 5, No. 5, May 2008, XP055501221, pp. 1145-1149.

* cited by examiner

*Primary Examiner* — Lauren R Colgan
(74) *Attorney, Agent, or Firm* — Pillsbury Winthrop Shaw Pittman LLP

(57) ABSTRACT

A material includes a transparent substrate on which is deposited a stack of layers including n silver-based metal functional layers and n+1 dielectric sets of layers, with $n \geq 3$ and each silver-based metal functional layer being placed between two dielectric sets of layers. The dielectric set of layers located below the first silver-based metal functional layer starting from the substrate and the dielectric set of layers located above the last silver-based metal functional layer starting from the substrate each include a high-refractive-index layer, the value of the index $\geq 2.15$ at the wavelength of 550 nm; the value of the refractive index of at least one of the high-index layers $\geq 2.40$ at the wavelength 550 nm; and the value of the ratio of the optical thickness of each of the high-refractive-index layers to the optical thickness of the dielectric set of layers in which it is included is included between 0.25 and 0.55.

20 Claims, No Drawings

MATERIAL COMPRISING A STACK WITH THERMAL PROPERTIES

CROSS-REFERENCE TO RELATED APPLICATIONS

This application is the U.S. National Stage of PCT/EP2018/066941, filed Jun. 25, 2018, which in turn claims priority to French patent application number 1756949 filed Jul. 21, 2017. The content of these applications are incorporated herein by reference in their entireties.

The present invention relates to a material comprising a transparent substrate on the surface of which is deposited a stack of layers that itself comprises a plurality of functional layers allowing solar and/or infrared radiation liable to strike said surface to be acted upon. The invention also relates to a glazing comprising such a material.

Legal agreements and instruments with the objective of decreasing the environmental impact of human activities are multiplying on the regional, national and international scale. These agreements and instruments in particular aim to decrease the power consumption of infrastructure. They recommend or require in particular buildings and transportation vehicles to be equipped so as to decrease the power consumption of their air-conditioning and heating means.

Glazed areas often constitute the majority of the external area of buildings and transportation vehicles, and their percentage is continuing to grow with a view to meeting the needs of users in terms of natural lighting. However, these glazed areas may be passive sources of heat, in particular during very sunny periods, and sources of dissipation of heat, in particular during winter periods. Therefore, the variations in temperature in the interior of buildings and vehicles equipped with these glazed areas may be very large. These temperature variations may cause sensations of discomfort and lead to high usage of air-conditioning and heating means.

For energy- and comfort-related reasons, these glazed areas must be functionalized in order to act on the incident infrared and/or solar radiation, so as to decrease "greenhouse effects". The functionalization of these areas is generally achieved by depositing, on said areas, a stack of layers comprising metal functional layers. These layers endow the areas, and the glazings that comprise them, with so-called "selective" functions allowing the amount of energy transmitted through the glazing to the interior to be decreased without prejudicing the transmission of light in the visible spectrum.

The performance of functionalized glazings or glazed areas is generally evaluated using free parameters:
  solar factor, g, defined as the ratio of the total energy transmitted through the glazed area or the glazing to the interior to the incident solar energy;
  light transmission in the visible spectrum, $T_L$, defined as the ratio of the amount of incident light to the amount of light in the visible spectrum transmitted through the glazed area or glazing;
  selectivity, s, defined as the ratio of light transmission $T_L$ to solar factor g, i.e. $T_L/g$.

Glazed areas and the glazings that comprise them therefore ideally possess functions such that:
  the light transmission is as high as possible, at least 65%, or even at least 68%,
  the solar factor is at most 36%,
  the selectivity at least 1.9.

Furthermore, for aesthetic reasons, these glazed areas and glazings must have, in exterior reflection, in the interior reflection and in transmission, an areal appearance that is pleasant to look at. This in particular requires a neutral color, i.e. one that is preferably close to the color gray, in the blue-green chromatic range, the shades of which must vary little as a function of angle of observation.

Patent application WO2012093238 A1 discloses a material comprising a stack of layers that itself comprises at least three silver-based metal functional layers, each of the functional layers being separated from one another by a dielectric set of layers. The dielectric set of layers located below the first functional layer starting from the substrate and the dielectric set of layers located above the last functional layer starting from the substrate each comprise a layer of high refractive index equal to or higher than 2.15 at 550 nm. The aforementioned values of light transmission, solar factor and selectivity are achieved only after the stack and substrate have undergone a heat treatment the temperature of which is higher than 500° C. The values of the two parameters a* and b* in the L*a*b* system are close to zero, in particular lower than 2 for a*, and vary little when the angle of observation varies between 0 and 60°.

Patent application WO2017006029 A1 describes a material comprising a transparent substrate and a stack of layers that itself comprises at least three silver-based metal functional layers, each of the functional layers being separated from each other by a dielectric set of layers. Each dielectric set of layers comprises at least one layer of high refractive index equal to or higher than 2.15 and of optical thickness larger than 20 nm. For each dielectric set of layers, the ratio of the optical thickness of the high-refractive-index layer to the optical thickness of the dielectric set that contains it is higher than 0.3. The aforementioned values of light transmission, solar factor and selectivity are achieved with no heat treatment. The glazing comprising the material also meets the same requirements in terms of color neutrality as document WO2012093238 A1.

For reasons of economy of the energy and mining resources required to manufacture them, it is advantageous to be able to simplify products while preserving the same performance levels. In the present case, it would be advantageous to achieve a material that meets the aforementioned requirements in terms of light transmission, solar factor, selectivity, and color with a simplified stack, while limiting if possible expensive chemical elements and without resorting to a heat treatment.

The present invention relates to a material comprising a transparent substrate on at least one surface of which is deposited a stack of layers comprising n silver-based metal functional layers and n+1 dielectric sets of layers, n being equal to or higher than 3 and each silver-based metal functional layer being placed between two dielectric sets of layers. Said material is noteworthy in that the dielectric set of layers located below the first silver-based metal functional layer starting from the substrate and the dielectric set of layers located above the last silver-based metal functional layer starting from the substrate
  each comprise a high-refractive-index layer, the value of said index being equal to or higher than 2.15 at the wavelength of 550 nm;
  the value of the refractive index of at least one of said high-index layers is equal to or higher than 2.40 at the wavelength 550 nm; and
  the value of the ratio of the optical thickness of each of said high-refractive-index layers to the optical thickness of the dielectric set of layers in which it is comprised is comprised between 0.25 and 0.55.

In the present description, use is made of the following definitions and conventions.

The terms "first", "last", "above" and "below" qualify the position of the layers or of a set of layers of the stack relative to the orientation and to the position of the substrate on which it is deposited. The position of the substrate may be horizontal, vertical or inclined depending on the choice adopted for the implementation of the invention. The order of enumeration of the layers or of the set of layers is defined from the substrate in the direction of that surface of the stack which is opposite the substrate. Thus, the terms "first" and "last", when they qualify a layer or a set of layers, mean that said layer or said set of layers is the closest to and the furthest from the substrate, respectively. The terms "above" and "below", qualifying the position of a layer or a set of layers and defined relative to the position of a functional layer, mean that said layer or said set of layers is closer to and further from the substrate, respectively. These two terms, "above" and "below", in no way mean that the layer or set of layers that they qualify and the functional layer with respect to which they are defined make contact with each other. They do not exclude the presence of other layers intermediate between these two layers. The term "contact" in expressions such as "making contact" or "in contact with" is explicitly used to indicate that no other layer is placed in between.

With no precision or qualifier, the term "thickness" used for a layer corresponds to the real or geometric physical thickness E of said layer. It is expressed in nanometers. The expression "optical thickness" is used to explicitly indicate the optical thickness, denoted Eo, of a layer. It is defined by the relationship Eo=n*E where n is the refractive index of the layer and E its real or geometric physical thickness. The refractive index of the layers is measured at the electromagnetic wavelength of 550 nm. Optical thickness is also expressed in nanometers.

The expression "dielectric set of layers" designates one or more layers making contact with one another and forming a stack that is dielectric on the whole, i.e. a stack that does not have the functions of a metal functional layer. If the dielectric set comprises a plurality of layers, the latter may themselves be dielectric. The thickness and optical thickness of a dielectric set of layers corresponds to the sum of the thicknesses and optical thicknesses of each of its constituent layers, respectively.

In the present description, the expressions "based on" and "-based", when used to qualify what a material or a layer contains, mean that the mass fraction of the constituent that it comprises is at least 50%, in particular at least 70%, preferably at least 90%.

The light transmission in the visible spectrum, solar factor and selectivity are defined, measured and calculated in conformity with standards EN 410 and EN 14501. Color is measured in the L*a*b* CIE 1976 color space according to standard ISO 11664 with an illuminant D65 and a visual field of 2° for the reference observer.

A glazing comprising a material according to the invention preferably has a light transmission in the visible spectrum of at least 68%, a solar factor of at most 36% and a selectivity of at least 1.9. The aesthetic appearance of the glazing is preferably characterized by a color that is neutral in reflection and the hue of which varies little when the angle of observation varies between 0 and 60°. In particular, the absolute value of the variation in the parameters a* and b* in the L*a*b* color space when the angle of observation varies between 0 and 60° is smaller than or equal to 5.

Each dielectric set of layers generally includes at least one layer based on a dielectric material that may be based on nitride, in particular silicon or aluminum nitrides, and/or based on oxide.

The metal functional layers are continuous layers. They are preferably three or four in number. The mass fraction of silver contained in the silver-based metal functional layers is at least 95%, preferably at least 98%.

In order to decrease the amount of material deposited, the thicknesses of the silver-based metal functional layers may advantageously be small, without prejudice to optical and thermal performance, provided that the thickness of each silver-based metal functional layer is larger than the thickness of the silver-based functional layer that precedes it starting from the substrate. Generally, the thickness of each of the silver-based functional layers may preferably be comprised between 6 and 20 nm.

For the same reason of decreasing the amount of material deposited, the thicknesses of the dielectric sets of layers may be small, without prejudice to optical and thermal performance, provided that the optical thickness of the dielectric set of layers located above the last silver-based metal functional layer starting from the substrate is smaller than or equal to the optical thickness of the dielectric set of layers located below the first silver-based metal functional layer starting from the substrate. By way of nonlimiting indication, the optical thickness of the dielectric set of layers located above the last silver-based metal functional layer starting from the substrate is comprised between 20 and 50 nm, preferably between 30 and 40 nm, and the optical thickness of the dielectric set of layers located below the first silver-based metal functional layer starting from the substrate is comprised between 50 and 100 nm, preferably between 55 and 75 nm.

According to the invention, the dielectric set of layers located below the first silver-based metal functional layer starting from the substrate and the dielectric set of layers located above the last silver-based metal functional layer starting from the substrate preferably each comprise a high-refractive-index layer, said index being equal to or higher than 2.15 at a wavelength of 550 nm. These high-refractive-index layers may be based on compounds chosen from $TiO_2$, $MnO$, $WO_3$, $NiO$, $ZnTiO_4$, $Nb_2O_5$, $BaTiO_3$, $Bi_3O_3$, $SiZrN$, $Zr_3N_4$.

When the value of the refractive index of at least one of said high-refractive-index layers is equal to or higher than 2.40 at a wavelength of 550 nm according to the invention, said layer may be based on compounds chosen from $TiO_2$, $BaTiO_3$, $Bi_3O_3$, $Zr_3N_4$.

If said high-refractive-index layers are all layers of refractive index higher than 2.40 at a wavelength of 550 nm, they may be based on the same compound or different compounds.

It is not necessary for the compounds comprised in the high-refractive-index layers, in particular those indicated by way of example, to be perfectly stoichiometric. They may deviate from stoichiometry with respect to their content of oxygen, nitrogen and/or other elements provided that the condition on the value of the refractive index, namely higher than 2.15 or 2.40 at a wavelength of 550 nm, is respected. Likewise, it is not excluded that they comprise dopant elements, such as aluminum.

The substantive "stoichiometry" and the adjective derived therefrom must be interpreted in the sense conventional in the technical field. It in particular means that the proportions of the constituent chemical elements of a compound correspond to those of the "defined compound" such as defined by thermochemical diagrams or the conventions in force in the technical field.

In order to decrease the amount of material deposited, the optical thicknesses of each of said high-refractive-index layers may advantageously be comprised between 10 and 70 nm, preferably between 20 and 50 nm.

It is preferable for the value of the absorption coefficient of the high-refractive-index layers to be lower than or equal to 0.02 at 550 nm. Therefore, although it may be possible to achieve the sought-after thermal and optical performance with metal layers of high refractive index, it is not advised to use them for the purposes of the invention. The value of their absorption coefficient is generally higher than 0.02. However, it is possible for an anneal in an oxidizing atmosphere of a material according to the invention comprising such a metal layer to allow said metal layer to be oxidized so that its refractive index is higher than 2.15 and the value of its absorption coefficient lower than or equal to 0.02.

According to one particular embodiment of the invention, the optical thickness of the dielectric set of layers located below the first silver-based functional layer is smaller than the optical thicknesses of each of the dielectric sets of layers located between the first and last silver-based metal functional layer. The main advantage of this embodiment is to allow the thicknesses of layers forming the stack to be further decreased. In particular, the optical thickness of each of the dielectric sets of layers located between the first and last silver-based metal functional layer is comprised between 100 and 200 nm, preferably between 150 and 180 nm.

According to another embodiment of the invention, each dielectric set of layers located between the first and last silver-based metal functional layers starting from the substrate comprises no high-refractive-index layer the value of the refractive index of which is equal to or higher than 2.15 at 550 nm. Specifically, it has been observed that there is no significant additional benefit when the first and last silver-based metal functional layers starting from the substrate comprise a high-index layer. The values of the optical and thermal parameters vary little. Such a high-index layer may therefore be omitted when a simplification of the stack is sought. This also has the advantage of decreasing the costs associated with the use of chemical elements required to form high-refractive-index layers.

The stack may furthermore comprise at least one so-called "lower contact" stabilization layer placed below and in contact with a silver-based metal functional layer. The function of this layer, which is generally of very small thickness, is to promote the adhesion and crystallization of the silver. This layer is also called a "wetting layer". In this sense, it may be advantageous for such a layered to be placed below and in contact with each one silver-based metal functional layer that the stack comprises. This layer is preferably based on oxides chosen from zinc oxides, nickel oxides, magnesium oxides, zinc-tin oxides, zinc-magnesium oxides, zinc-titanium oxides.

The compounds comprised in the "lower contact" layers may deviate from stoichiometry with respect to the content of oxygen, nitrogen and/or other elements. They may comprise dopant elements, such as aluminum for zinc oxide.

The stack may also furthermore comprise a so-called blocker layer placed above and in contact with a silver-based metal functional layer. The function of this layer, which is generally of very small thickness, is to protect the silver layer when the deposition of the subsequent layer is carried out in an oxidizing atmosphere or when certain elements such as oxygen are liable to migrate from one layer to another during a heat treatment. If it is necessary to protect each silver layer, it is advantageous for a blocker layer to be placed above and in contact with each silver-based functional layer that the stack comprises. This layer is preferably based on metals or alloys chosen from Ti and NiCr.

The stack may optionally furthermore comprise a so-called smoothing layer placed below and in contact with the lower contact layer. Its function is to promote the growth of the lower contact layer. This smoothing layer is based on a mixed oxide, preferably an oxide of zinc and tin when the lower contact layer is based on zinc oxide. It may be completely amorphous or partially crystalline. It is generally non-crystalline throughout its thickness.

According to one particularly advantageous embodiment of the invention, the high-refractive-index layer comprised in the dielectric set of layers located below the first silver-based metal functional layer is based on titanium oxide, and the high-refractive-index layer comprised in the dielectric set of layers located above the last functional layer from the substrate is based on zirconium and silicon nitride. The value of the Zr/Si atomic ratio of said zirconium and silicon nitride may preferably be lower than or equal to 1.

The smoothing layer and the lower contact layer are considered to be comprised in the dielectric set of layers that is placed under the silver-based metal functional layer to which these two layers relate.

In a first preferred embodiment of the invention, the stack comprises starting from the substrate:
a first dielectric set of layers comprising:
a high-refractive-index layer based on titanium oxide, the value of the refractive index of which is higher than 2.40 at 550 nm and the optical thickness of which is comprised between 10 and 50 nm, or even between 20 and 40 nm, preferably between 30 and 40 nm;
a smoothing layer based on an oxide of zinc and tin, the optical thickness of which is comprised between 10 and 30 nm, preferably between 15 and 25 nm;
a lower contact layer based on zinc oxide, the thickness of which is comprised between 10 and 20 nm,
a first silver-based metal functional layer, the thickness of which is comprised between 6 and 20 nm;
a first titanium-based metal blocker layer the thickness of which is comprised between 0.5 and 1.5 nm;
a second dielectric set of layers comprising:
a dielectric layer based on zinc oxide the optical thickness of which is comprised between 5 and 15 nm, preferably between 8 and 12 nm;
a dielectric layer based on silicon nitride the optical thickness of which is comprised between 100 and 150 nm, preferably between 100 and 130 nm;
a smoothing layer based on an oxide of zinc and tin, the optical thickness of which is comprised between 10 and 30 nm, preferably between 15 and 25 nm;
a lower contact layer based on zinc oxide, the optical thickness of which is comprised between 10 and 20 nm,
a second silver-based metal functional layer, the thickness of which is comprised between 6 and 20 nm;
a second titanium-based metal blocker layer the thickness of which is comprised between 0.5 and 1.5 nm;
a third dielectric set of layers comprising:
a dielectric layer based on zinc oxide the optical thickness of which is comprised between 5 and 15 nm, preferably between 8 and 12 nm;

a dielectric layer based on silicon nitride the optical thickness of which is comprised between 100 and 150 nm, preferably between 100 and 130 nm;

a smoothing layer based on an oxide of zinc and tin, the optical thickness of which is comprised between 10 and 30 nm, preferably between 15 and 25 nm;

a lower contact layer based on zinc oxide, the optical thickness of which is comprised between 10 and 20 nm, a third silver-based metal functional layer the thickness of which is comprised between 6 and 20 nm;

a third titanium-based metal blocker layer the thickness of which is comprised between 0.5 and 1.5 nm;

a fourth dielectric set of layers comprising:

a dielectric layer based on zinc oxide the optical thickness of which is comprised between 5 and 15 nm, preferably between 8 and 12 nm;

a high-refractive-index layer based on a nitride of silicon and zirconium, the value of the refractive index of which is higher than 2.15 at 550 nm and the optical thickness of which is comprised between 10 and 50 nm, or even between 30 and 40 nm, preferably between 20 and 30 nm;

a dielectric layer based on silicon nitride the optical thickness of which is comprised between 100 and 150 nm, preferably between 100 and 130 nm;

a smoothing protective layer based on an oxide of zinc and tin, the optical thickness of which is comprised between 5 and 20 nm, preferably between 9 and 12 nm.

In a second preferred embodiment of the invention, the stack consists, starting from the substrate, of:

a first dielectric set of layers comprising:

a high-refractive-index layer based on titanium oxide, the value of the refractive index of which is higher than 2.40 at 550 nm and the optical thickness of which is comprised between 10 and 50 nm, or even between 20 and 40 nm, preferably between 30 and 40 nm;

a smoothing layer based on an oxide of zinc and tin, the optical thickness of which is comprised between 10 and 30 nm, preferably between 15 and 25 nm;

a lower contact layer based on zinc oxide, the thickness of which is comprised between 10 and 20 nm, a first silver-based metal functional layer, the thickness of which is comprised between 6 and 20 nm;

a first titanium-based metal blocker layer the thickness of which is comprised between 0.5 and 1.5 nm;

a second dielectric set of layers comprising:

a dielectric layer based on zinc oxide the optical thickness of which is comprised between 5 and 15 nm, preferably between 8 and 12 nm;

a dielectric layer based on silicon nitride the optical thickness of which is comprised between 100 and 150 nm, preferably between 100 and 130 nm;

a smoothing layer based on an oxide of zinc and tin, the optical thickness of which is comprised between 10 and 30 nm, preferably between 15 and 25 nm;

a lower contact layer based on zinc oxide, the optical thickness of which is comprised between 10 and 20 nm, a second silver-based metal functional layer, the thickness of which is comprised between 6 and 20 nm;

a second titanium-based metal blocker layer the thickness of which is comprised between 0.5 and 1.5 nm;

a third dielectric set of layers comprising:

a dielectric layer based on zinc oxide the optical thickness of which is comprised between 5 and 15 nm, preferably between 8 and 12 nm;

a dielectric layer based on silicon nitride the optical thickness of which is comprised between 100 and 150 nm, preferably between 100 and 130 nm;

a smoothing layer based on an oxide of zinc and tin, the optical thickness of which is comprised between 10 and 30 nm, preferably between 15 and 25 nm;

a lower contact layer based on zinc oxide, the optical thickness of which is comprised between 10 and 20 nm, a third silver-based metal functional layer the thickness of which is comprised between 6 and 20 nm;

a third titanium-based metal blocker layer the thickness of which is comprised between 0.5 and 1.5 nm;

a fourth dielectric set of layers comprising:

a dielectric layer based on zinc oxide the optical thickness of which is comprised between 5 and 15 nm, preferably between 8 and 12 nm;

a high-refractive-index layer based on a nitride of silicon and zirconium, the value of the refractive index of which is higher than 2.15 at 550 nm and the optical thickness of which is comprised between 10 and 50 nm, or even between 30 and 40 nm, preferably between 20 and 30 nm;

a dielectric layer based on silicon nitride the optical thickness of which is comprised between 100 and 150 nm, preferably between 100 and 130 nm;

a smoothing protective layer based on an oxide of zinc and tin, the optical thickness of which is comprised between 5 and 20 nm, preferably between 9 and 12 nm.

The transparent substrate according to the invention may be a planar or curved, rigid or supple, organic or mineral substrate. It will preferably be colorless in order to minimize the absorption of light and thus preserve a maximum light transmission.

Examples of organic substrates able to advantageously be used to implement the invention are polymer materials such as polyethylenes, polyesters, polyacrylates, polycarbonates, polyurethanes, polyamides. These polymers may be fluoropolymers.

Examples of mineral substrates able to advantageously be implemented in the invention are sheets of mineral glass or glass-ceramic. The glass is preferably a soda-lime-silica, borosilicate, aluminosilicate or even alumino-boro-silicate glass.

According to one embodiment of the material according to the invention, the stack is deposited on the transparent substrate using conventional deposition methods known to those skilled in the art. Preferably, the stack may be deposited using the magnetron cathode sputtering method.

In one particular embodiment of the invention, the transparent substrate is a sheet of mineral glass. The material according to the invention may then be an element of a monolithic, laminated or multiple glazing.

A monolithic glazing comprises a single glass sheet. When the material according to the invention is used as a monolithic glazing, the stack is preferably deposited on the face of the glass sheet oriented toward the interior of the room of the building on the walls of which room the glazing is installed. In such a configuration, it may be advantageous to protect the stack from physical or chemical degradation using a suitable means.

A multiple glazing comprises at least two parallel glass sheets separated by a cavity filled with insulating gas. Most multiple glazings are double or triple glazings, i.e. they comprise two or three glazings, respectively. When the material according to the invention is used as an element of a multiple glazing, the stack is preferably deposited on the face of the glass sheet oriented toward the interior in contact with the insulating gas. This arrangement has the advantage of protecting the stack from chemical or physical degradation by the exterior environment.

A laminated glazing comprises at least two parallel glass sheets separated by an interlayer sheet. This interlayer sheet is generally an organic material, such as for example polyvinyl butyral (PVB). When the material according to the invention is used as an element of a laminated glazing, the stack may be deposited on either one of the faces of the glass sheet, whether these faces make contact with the interlayer sheet or not. The deposition of the stack on the face of the glass sheet in contact with the interlayer sheet may be advantageous with respect to preventing chemical or physical degradation by the exterior environment. It is necessary however to ensure that the constituents of the interlayer sheet are not of such a nature that they interact with the layers of the stack and cause its degradation.

A glazing comprising a material according to the invention has a neutral color in exterior reflection in the blue or blue-green chromatic range. The visual appearance varies little whatever the angle of observation. An observer is unable to perceive any nonuniformity in hue. In the L*a*b* system, the color of the glazing is preferably characterized, in transmission, in internal reflection and/or in external reflection, by a value for the parameter a* comprised between −4 and 1 and a value of the parameter b* comprised between −7.5 and 0.5. In particular, the absolute value of the variation in the parameters a* and b* in the L*a*b* color space when the angle of observation varies between 0 and 60° is smaller than or equal to 5.

The features and advantages of the material according to the invention are illustrated by the examples described below, which refer to the following figures.

For the sake of illustration of the technical effect specific to the present invention, six examples of materials according to the invention and one comparative example of a material, which does not possess the features of the materials according to the invention, were manufactured. The stacks of layers are described in table 1. They were deposited on a sheet of soda-lime-silica glass of a thickness of 6 mm. The deposition conditions of the layers were those conventionally used by those skilled in the art with magnetron cathode sputtering, and are widely documented in the literature, for example in patent applications WO2012/093238 and WO2017/006029.

Each of these stacks of layers comprises:
three silver-based metal functional layers, denoted CFM1, CFM2 and CFM3 respectively starting from the substrate;
four dielectric sets of layers, denoted ED1, ED2, ED3 and ED4, respectively;
three blocker layers, denoted B1, B2 and B3, respectively.

The values of the table correspond to the total optical thicknesses of the dielectric sets, i.e. to the sums of the optical thicknesses of the layers from which they are respectively made, and to the real or geometric physical thicknesses of the silver-based metal functional layers and the blocker layers. In the table, the row "CHI" indicates the optical thickness of the high-refractive-index layer that each dielectric set of layers comprises. The row "CBI" indicates the optical thickness of the low-refractive-index layer or the sum of the optical thicknesses of the low-refractive-index layers that each dielectric set of layers comprises. The value of the refractive index of the one or more low-index layers is lower than 2.15. The underlined and emboldened values indicate that the value of the refractive index of the high-refractive-index layer is equal to or higher than 2.40. At the bottom of the table are given the values of the ratios of the optical thickness of the high-index layer to the optical thickness of the dielectric set of layers that comprises it. These values are provided only for the dielectric sets of layers ED1 and ED4.

The nature of the blocker layers, of the high-refractive-index layers and of the layers from which the dielectric sets of layers are composed is not indicated in table 1. The lower contact layers may be based on oxides chosen from zinc oxides, nickel oxides, magnesium oxides, zinc-tin oxides, zinc-magnesium oxides, zinc-titanium oxides. The blocker layers may be based on metals and alloys such as Ti or NiCr. The high-refractive-index layers may be based on compounds chosen from $TiO_2$, MnO, $WO_3$, NiO, $ZnTiO_4$, $Nb_2O_5$, $BaTiO_3$, $Bi_2O_3$ SiZrN. Lastly, the layers, other than the high-refractive-index layers, comprised in the dielectric sets of layers are generally oxides, oxynitrides or metal nitrides such as, by way of example, $SiO_2$, $TiO_2$, $SnO_2$, ZnO, $ZnAlO_x$, $Si_3N_4$, AlN, $Al_2O_3$, $ZrO_2$, $Nb_2O_5$ and mixtures thereof. These compounds may deviate from stoichiometry and comprise dopant elements such as aluminum in particular.

TABLE 1

| | | Example 1 | Example 2 | Example 3 | Example 4 | Example 5 | Example 6 | Comparative Example 1 |
|---|---|---|---|---|---|---|---|---|
| ED4 | CBI | 33.3 | 33.3 | 33.3 | 33.3 | 33.7 | 33.3 | 33.3 |
| | CHI | 35.8 | 33.8 | 29.1 | 29.2 | 35.8 | 29.2 | 29.1 |
| B3 | | 2.0 | 2.0 | 2.0 | 2.0 | 2.0 | 2.0 | 2.0 |
| CFM3 | | 16.3 | 17.3 | 17.7 | 17.7 | 18.5 | 17.7 | 17.6 |
| ED3 | CBI | — | 118.6 | 173.3 | 173.3 | 174.9 | 173.3 | 171.4 |
| | CHI | 165.3 | 53.5 | — | — | — | — | — |
| B2 | | 0.5 | 0.5 | 0.5 | 0.5 | 0.5 | 0.5 | 0.5 |
| CFM2 | | 14.0 | 14.3 | 14.2 | 14.2 | 13.8 | 14.2 | 14.1 |
| ED2 | CBI | — | 114.8 | 167.2 | 167.2 | 167.2 | 167.2 | 168.3 |
| | CHI | 162.8 | 52.0 | — | — | — | — | — |
| B1 | | 0.5 | 0.5 | 0.5 | 0.5 | 0.5 | 0.5 | 0.5 |
| CFM1 | | 8.7 | 9.3 | 9.2 | 9.2 | 8.1 | 9.2 | 9.5 |
| ED1 | CBI | 62.4 | 62.4 | 62.4 | 62.4 | 62.4 | 62.4 | 21.8 |
| | CHI | 24.5 | 27.9 | 24.7 | 24.7 | 32.3 | 24.6 | 74.1 |
| substrate | | | | Sheet of soda-lime-silica glass | | | | |
| R4 (Eohi4/ | | 0.52 | 0.50 | 0.47 | 0.47 | 0.52 | 0.47 | 0.47 |

TABLE 1-continued

|  | Example 1 | Example 2 | Example 3 | Example 4 | Example 5 | Example 6 | Comparative Example 1 |
|---|---|---|---|---|---|---|---|
| EoED4) |  |  |  |  |  |  |  |
| R1 (Eohi4/ EoED1) | 0.28 | 0.31 | 0.28 | 0.28 | 0.34 | 0.28 | 0.77 |

In table 2 are given the values of a plurality of parameters allowing the optical and thermal performance of the examples of materials of table 1 to be evaluated. These values were measured on a double glazing comprising the materials of the examples and having the following 6/16/4 structure: soda-lime-silica glass of a thickness of 6 mm/gas-filled cavity of a thickness of 16 mm containing at least 90% argon/soda-lime-silica glass of a thickness of 4 mm. The stack of layers was deposited on the glass of a thickness of 6 mm, on the interior face in contact with the argon-containing gas-filled cavity.

The light transmission in the visible spectrum, $T_L$, the solar factor, g, and the selectivity, s, and the internal reflection, Rint, and the external reflection, Rext, in the visible spectrum are defined, measured and calculated in conformity with standards EN 410 and EN 14501. Color was measured in the L*a*b* CIE 1976 color space according to standard ISO 11664 with a D65 illuminant and a visual field of 2° for the reference observer.

TABLE 2

|  | Example 1 | Example 2 | Example 3 | Example 4 | Example 5 | Example 6 | Comparative Example 1 |
|---|---|---|---|---|---|---|---|
| TL | 67.7 | 68 | 68.1 | 68.3 | 68.8 | 68.7 | 67.9 |
| a*T | −3.7 | −3 | −3.7 | −2.9 | −2.8 | −3.3 | −3 |
| b*T | 3.8 | 0.7 | −0.5 | −0.5 | 0 | 0.1 | 0.1 |
| Rext | 10.2 | 11.3 | 10.7 | 12.6 | 12.2 | 12.2 | 12 |
| a*Rext | −0.8 | −1.1 | −1 | −2.5 | −1.9 | −1 | −1.9 |
| b*Rext | −4.5 | −6.7 | −4.7 | −7.4 | −7.3 | −7.2 | −4.8 |
| Rint | 12.7 | 14.3 | 11.2 | 15.5 | 14.7 | 14.9 | 15.2 |
| a*Rint | −2.2 | −3.3 | 1 | −2.8 | −2.4 | −2 | −1.6 |
| b*Rint | −2.3 | 0 | −2.6 | −2 | −1 | −1 | −1.5 |
| a*60 | −1 | −2.2 | −0.8 | −1.5 | −1.8 | −1.9 | −1.3 |
| b*60 | −3.9 | −3.8 | −3.6 | −5 | −3.2 | −4.4 | −2.7 |
| g | 35.2 | 35 | 35.1 | 35.06 | 35 | 35 | 35.1 |
| s | 1.92 | 1.94 | 1.94 | 1.95 | 1.97 | 1.96 | 1.93 |

In table 2:
- a*T and b*T are the values of the parameters a* and b* measured in transmission in the L*a*b* CIE 1976 color space with an illuminant D65, a visual field of 2° for the observer and an angle of observation of zero with respect to the normal to the surface of the glazing;
- Rext is the value of the light reflection in the visible spectrum, expressed in percent, measured with an illuminant D65, a visual field of 2° for the observer on the external face of the soda-lime-silica glass of 6 mm thickness of said double glazing;
- a*Rext and b*Rext are the values of the parameters a* and b* measured in reflection in the L*a*b* CIE 1976 color space with an illuminant D65 and with a visual field of 2° for the observer on the external face of said soda-lime-silica glass of 6 mm thickness of said double glazing at an angle of observation of zero with respect to the normal to the surface of the glazing;
- Rint is the value of the light reflection in the visible spectrum, expressed in percent, measured with an illuminant D65, a visual field of 2° for the observer on the external face of the soda-lime-silica glass of 4 mm thickness of said double glazing;
- a*Rint and b*Rint are the values of the parameters a* and b* measured in reflection in the L*a*b* CIE 1976 color space with an illuminant D65 and with a visual field of 2° for the observer on the external face of said soda-lime-silica glass of 4 mm thickness of said double glazing at an angle of observation of zero with respect to the normal to the surface of the glazing;
- a*60 and b*60 are the values of the parameters a* and b* measured in reflection in the L*a*b* CIE 1976 color space with an illuminant D65 and with a visual field of 2° for the observer on a single glazing at an angle of observation of 60° with respect to the normal to the surface of the glazing.

Examples 1 to 6 of table 1 are examples of materials according to the invention.

In example 1, each dielectric set of layers comprises a high-refractive-index layer the value of the refractive index of which is higher than 2.15. The dielectric sets of layers ED2 and ED3 are made up solely of high-refractive-index layers. The value of the refractive index of the high-refractive-index layer comprised in the dielectric set of layers ED1 is higher than 2.40. The light transmission obtained is lower than 68%. Furthermore, the value of the parameter b*T is higher than 3, this corresponding to a yellow tint in transmission.

Example 2 is similar to example 1 except that the dielectric sets of layers ED2 and ED4 also comprise other layers that do not have a high refractive index. The optical thicknesses of each of the layers of these two sets were made so that the sums of the optical thicknesses of these two sets remain comparable to those of example 1. In this example the stack is more complex but the values of the parameters used to evaluate optical and thermal performance remain comparable. The fact that the dielectric sets of layers ED2 and ED3 comprise a high-index layer has no additional advantage.

Examples 3 to 6 are improvements of examples 1 and 2. In these examples, the dielectric sets of layers ED2 and ED3 comprise no high-refractive-index layers the value of the refractive index of which is higher than 2.15. In examples 3 and 5, only the dielectric set of layers ED1 comprises a high-refractive-index layer the value of the refractive index of which is higher than 2.40. In example 6, this layer is comprised solely in the dielectric set of layers ED4. In example 4, the dielectric sets of layers ED1 and ED4 each comprise a high-refractive-index layer the value of the refractive index of which is higher than 2.40.

It should be clear, from the values of table 2, that examples 3 to 6 of materials according to the invention allow optical and thermal performance to be improved with respect to examples 1 and 2. The light transmission in the visible spectrum, $T_L$, is higher than 68%, the solar factor, g, is lower than 36% and the selectivity, s, is 1.9 or more. The values of the parameter a* are lower than 1, and lower than 0 for examples 1, 2, 4, 5 and 6. The values of the parameters b* are lower than 1. The absolute value of the variations in each of these two parameters when the angle of observation varies between 0 and 60° is lower than 5.

Comparative example 1 is an example of a material that is not according to the invention. The dielectric sets of layers ED1 and ED4 only comprise high-refractive-index layers the values of which are equal to or higher than 2.15 and lower than 2.40. The ratio R1 is higher than 0.55. The obtained light transmission is lower than 68%.

Two other examples of materials corresponding to preferred embodiments of the invention are indicated in table 3. The stacks were deposited on a sheet of soda-lime-silica glass of a thickness of 6 mm. The deposition conditions of the layers are those conventionally used by those skilled in the art with magnetron cathode sputtering, and are widely documented in the literature, for example, in patent applications WO2012/093238 and WO2017/006029.

Each of the stacks of layers comprises:
three silver-based metal functional layers, denoted Ag1, Ag2 and Ag3 respectively starting from the substrate;
four dielectric sets of layers, denoted D1, D2, D3 and D4, respectively;
three blocker layers based on metal titanium, denoted B1, B2 and B3, respectively.

The dielectric sets of layers D1, D2 and D3 comprise a lower contact layer based on zinc oxide placed below and in contact with the silver layers Ag1, Ag2 and Ag3, respectively. They also comprise a smoothing layer placed below and in contact with the lower contact layers based on zinc oxide.

The dielectric set of layers D1 comprises a high-refractive-index layer based on titanium oxide and the value of the refractive index of which is higher than 2.40. The dielectric set of layers D4 comprises a high-refractive-index layer based on a nitride of zirconium and silicon and the value of the refractive index of which is higher than 2.15 and lower than 2.40.

The values of table 3 correspond to the optical thicknesses of the layers comprised in the dielectric sets, and to the real or geometric physical thicknesses of the silver-based metal functional layers and blocker layers. In all of the examples, the nature of the metal functional layers, of the blocker layers and of the layers comprised in the dielectric sets of layers is indicated. For each of the two examples, the values of the ratios R1 and R4 are comprised between 0.25 and 0.55.

The values of the parameters allowing the optical and thermal performance of the examples of materials of table 3 to be evaluated are given in table 4. These values were measured on a double glazing comprising the materials of the examples and having the following 6/16/4 structure: soda-lime-silica glass of a thickness of 6 mm/gas-filled cavity of a thickness of 16 mm containing at least 90% argon/soda-lime-silica glass of a thickness of 4 mm. The stack of layers was deposited on the glass of a thickness of 6 mm, on the interior face in contact with the argon-containing gas-filled cavity. The definitions of the parameters and the methods used to measure them are identical to those described with respect to table 2.

The two examples of table 3 allow the sought-after optical and thermal performance to be achieved. The light transmission, $T_L$, is higher than 68%, the solar factor, g, is lower than 36% and the selectivity, s, is 1.9 or more. The values of the parameter a* are lower than 4 and the values of the parameters b* are lower than 1. The absolute values of the variations in each of these two parameters when the angle of observation varies between 0 and 60° are lower than 5.

TABLE 3

|  |  | Example 7 | Example 8 |
|---|---|---|---|
| D4 | SnZnO | 11.9 | 9.7 |
|  | SiN | 24.1 | 23.7 |
|  | SiZrN | 23.3 | 20.4 |
|  | ZnO | 9.5 | 11.1 |
| B3 | Ti | 1.3 | 0.9 |
| Ag3 | Ag | 17.0 | 16.5 |
| D3 | ZnO | 17.2 | 17.4 |
|  | SnZnO | 20.8 | 20.2 |
|  | SiN | 116.7 | 103.2 |
|  | ZnO | 12.7 | 11.9 |
| B2 | Ti | 0.7 | 0.7 |
| Ag2 | Ag | 12.9 | 12.6 |
| D2 | ZnO | 13.9 | 13.9 |
|  | SnZnO | 16.1 | 18.3 |
|  | SiN | 131.5 | 129.2 |
|  | ZnO | 9.9 | 8.9 |
| B1 | Ti | 0.9 | 0.9 |
| Ag1 | Ag | 8.6 | 7.8 |
| D1 | ZnO | 17.0 | 16.8 |
|  | SnZnO | 18.1 | 19.0 |
|  | TiOx | 38.5 | 37.7 |
| substrate | 6 mm sheet of soda-lime-silica glass | | |
| R4 (Eohi4/EoED4) |  | 0.41 | 0.37 |
| R1 (Eohi4/EoED1) |  | 0.52 | 0.51 |

TABLE 4

|  | Example 7 | Example 8 |
|---|---|---|
| TL | 69.3 | 69.3 |
| a*T | −4.4 | −4.1 |
| b*T | 3.1 | 2.1 |
| Rext | 11.2 | 11.7 |
| a*Rext | −2.2 | −2.7 |
| b*Rext | −6.7 | −6.2 |
| Rint | 12.8 | 13.9 |
| a*Rint | −2.7 | −3 |
| b*Rint | −2.1 | −1.5 |
| a*60 | −4.7 | −2.6 |
| b*60 | −1.6 | −2.9 |
| g | 34.5 | 34.8 |
| s | 2.01 | 1.99 |

The invention claimed is:

1. A material comprising a transparent substrate on at least one surface of which is deposited a stack of layers comprising n silver-based metal functional layers and n+1 dielectric sets of layers, n being equal to or higher than 3 and each silver-based metal functional layer being placed between two dielectric sets of layers, wherein the dielectric set of layers comprising all dielectric layers located below the first silver-based metal functional layer starting from the substrate and the dielectric set of layers comprising all dielectric layers located above the last silver-based metal functional layer starting from the substrate each comprise a high-refractive-index layer, the value of said index being equal to or higher than 2.15 at the wavelength of 550 nm;

the value of the refractive index of at least one of said high-index layers is equal to or higher than 2.40 at the wavelength 550 nm;

the value of the ratio of the optical thickness of each of said high-refractive-index layers to a total optical thickness of the dielectric set of layers in which it is comprised is comprised between 0.25 and 0.55; and wherein the total optical thickness of the dielectric set of layers located below the first silver-based metal functional layer starting from the substrate is up to 100 nm wherein the optical thicknesses of each of said high-refractive-index layers are comprised between 10 and 70 nm.

2. The material as claimed in claim 1, wherein the total optical thickness of the dielectric set of layers located above the last silver-based metal functional layer starting from the substrate is smaller than or equal to the total optical thickness of the dielectric set of layers located below the first silver-based metal functional layer starting from the substrate.

3. The material as claimed in claim 2, wherein the total optical thickness of the dielectric set of layers located above the last silver-based metal functional layer starting from the substrate is comprised between 20 and 50 nm, and the total optical thickness of the dielectric set of layers located below the first silver-based metal functional layer starting from the substrate is comprised between 50 and 100 nm.

4. The material as claimed in claim 3, wherein the total optical thickness of the dielectric set of layers located above the last silver-based metal functional layer starting from the substrate is comprised between 30 and 40 nm, and the total optical thickness of the dielectric set of layers located below the first silver-based metal functional layer starting from the substrate is comprised between 55 and 75 nm.

5. The material as claimed in claim 1, wherein the total optical thickness of the dielectric set of layers located below the first silver-based functional layer is smaller than the optical thicknesses of each of the dielectric sets of layers located between the first and last silver-based metal functional layers.

6. The material as claimed in claim 1, wherein a total optical thickness of each of the dielectric sets of layers located between the first and last silver-based metal functional layer is comprised between 100 and 200 nm.

7. The material as claimed in claim 6, wherein the total optical thickness of each of the dielectric sets of layers located between the first and last silver-based metal functional layer is comprised between 150 and 180 nm.

8. The material as claimed in claim 1, wherein the value of the absorption coefficient of the high-refractive-index layers is lower than or equal to 0.02 at 550 nm.

9. The material as claimed in claim 1, wherein each dielectric set of layers located between the first and last silver-based metal functional layers starting from the substrate does not comprise any high-refractive-index layer the value of the refractive index of which is equal to or higher than 2.15 at 550 nm.

10. The material as claimed in claim 1, wherein the high-refractive-index layers are based on compounds chosen from $TiO_2$, MnO, $WO_3$, NiO, $ZnTiO_4$, $Nb_2O_5$, $BaTiO_3$, $Bi_2O_3$ SiZrN.

11. The material as claimed in claim 1, wherein the high-refractive-index layer comprised in the dielectric set of layers located below the first silver-based metal functional layer is based on titanium oxide, and the high-refractive-index layer comprised in the dielectric set of layers located above the last functional layer from the substrate is based on zirconium and silicon nitride.

12. The material as claimed in claim 1, wherein the thickness of each silver-based metal functional layer is larger than the thickness of the silver-based functional layer that precedes it starting from the substrate.

13. The material as claimed in claim 1, wherein the thickness of each of the silver-based metal functional layers is comprised between 6 and 20 nm.

14. The material as claimed in claim 1, wherein the stack of layers further comprises at least one blocker layer placed above and in contact with a silver-based metal functional layer.

15. The material as claimed in claim 14, wherein the at least one blocker layer is a metal layer based on a metal or an alloy chosen from Ti and NiCr.

16. The material as claimed in claim 1, wherein the stack of layers further comprises at least one lower contact layer placed below and in contact with a silver-based metal functional layer, said one or more lower contact layers being based on oxides chosen from zinc oxides, nickel oxides, magnesium oxides, zinc-tin oxides, zinc-magnesium oxides, zinc-titanium oxides.

17. The material as claimed in claim 16, wherein at least one smoothing layer is placed below and in contact with a lower contact layer based on zinc oxide, said one or more smoothing layers being based on tin and zinc oxide.

18. The material as claimed in claim 1, wherein the transparent substrate is a glass sheet.

19. The material as claimed in claim 1, wherein the optical thicknesses of each of said high-refractive-index layers are comprised between 20 and 50 nm.

20. A glazing comprising at least one material as claimed in claim 1.

\* \* \* \* \*